July 12, 1960
A. C. ANDERSON
2,944,839
COUPLING FOR REINFORCED PLASTIC PIPE
Filed Dec. 8, 1958
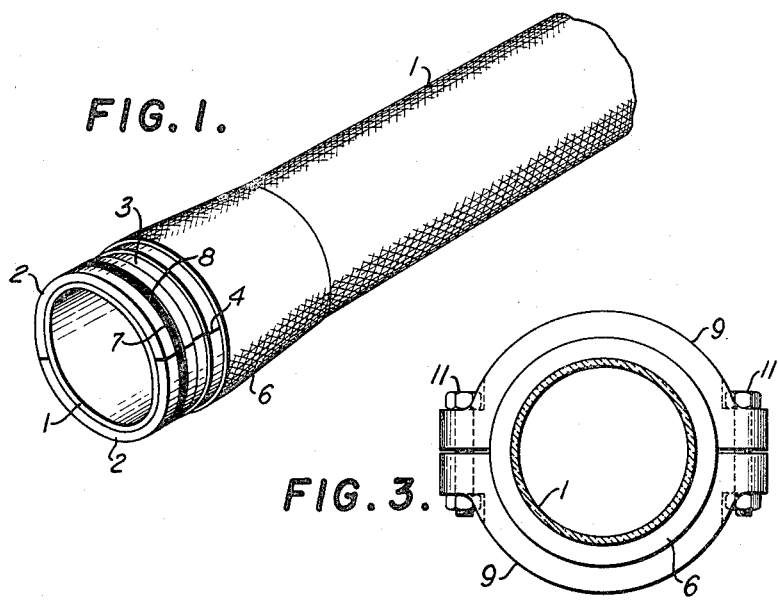
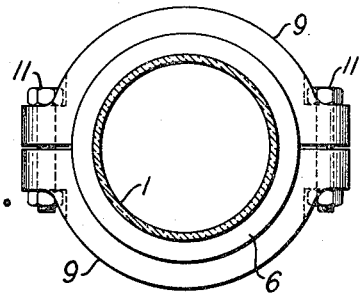
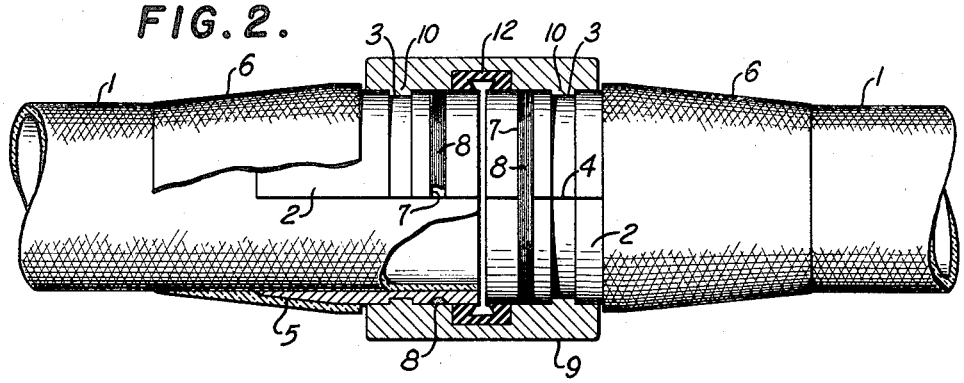
INVENTOR.
ARCHIE C. ANDERSON
BY
Attorneys

2,944,839
COUPLING FOR REINFORCED PLASTIC PIPE

Archie C. Anderson, Milwaukee, Wis., assignor to A. O. Smith Corporation, Milwaukee, Wis., a corporation of Wisconsin Filed Dec. 8, 1958, Ser. No. 778,694

5 Claims. (Cl. 285—45)

This invention relates to a pipe construction and more particularly to means for attaching resin pipe sections together.

The coupling of sections of resin pipe can be carried out in any one of several ways. Straight sleeve couplings are frequently bonded to the pipe ends with resin and while this method works satisfactorily in the plant, it requires semiskilled workmen and clean, dry working conditions. Because of this, this method of coupling is not entirely satisfactory for use in the field.

Threaded ends or grooved ends to receive a coupling device have been employed to join pipe sections together but this often requires a wall section that is thicker than the wall section necessary to withstand the internal pressures normally encountered in service. If the entire pipe is made thick enough for threading or grooving of the ends, the pipe is then overdesigned in bursting strength.

The end portions of a pipe can be built up in thickness to accommodate threading or grooving. However, the method of building up pipe ends by wrapping additional layers of fiber about the end portions of the pipe is both time consuming and costly.

In some cases the ends of the pipe are strengthened for coupling by bonding a metal sleeve to the windings adjacent the ends of the pipe. However, due to the difference in Young's modulus of metal and the reinforced resin pipe, steel being approximately ten times as stiff as the reinforced resin, a stress concentration appears in the pipe when the pipe is subjected to internal pressure. The stress concentration is very high at the portion of the pipe in alignment with the inner end of the metal sleeve.

The present invention is directed to a pipe construction utilizing a metal sleeve wherein the stress concentrations are minimized. According to the invention, the metal sleeve is split longitudinally to provide a plurality of individual arcuate segments. The segments are bonded to the pipe and an additional layer of fiber reinforcement is wound around the segments and extended axially inwardly beyond the end of the metal segments to overlay a portion of the pipe.

With this construction, the sleeve is able to expand in a radial direction as the pipe expands under internal pressure. The restraining effect of the metal sleeve is no longer directly proportional to the modulus of elasticity of the metal, as in the case of a one-piece metal sleeve, but is more nearly proportional to the modulus of elasticity of the fiber reinforced resin.

Extending the outer layer of fiber reinforcement axially beyond the end of the metal sleeve spreads the stress due to the difference in modulus between the materials over a larger area of the pipe and thus reduces the stress concentrations in the pipe.

The drawing illustrates the best mode presently contemplated of carrying out the present invention as described hereinafter.

In the drawing:

Figure 1 is a perspective view of a pipe section embodying the present invention;

Figure 2 is a side elevation with parts broken away in section of two pipe sections coupled together; and Figure 3 is a transverse section of the coupled pipes shown in Figure 2.

The drawing illustrates a fiber reinforced, resin-bonded pipe section 1. The fibrous reinforcement may take the form of long strands of fibrous material, such as glass, mineral, or synthetic fibers or the like, wound circumferentially, or the fibrous reinforcement may be in the form of fabric or matting. An uncured liquid, thermosetting resin is applied to the fiber reinforcement and on curing of the resin an integral, resin-bonded structure results.

To couple two sections of pipe together, a metal sleeve 2 is disposed around the pipe 1 adjacent the ends thereof. The sleeve 2 may be formed of a metal, such as steel, which has a substantially higher bearing strength, compressive strength and shear strength than the pipe in order to resist the coupling stresses.

As the modulus of elasticity of the metal sleeve 2 is much greater than that of the reinforced resin pipe 1, the sleeve 2, if in the form of a solid one-piece ring, would tend to restrict the radial expansion of the pipe when subjected to internal pressure and severe stress concentrations would be set up in the pipe. Therefore, to enable the sleeve 2 to expand radially in accordance with the expansion of the pipe 1 under internal pressure, the sleeve is split longitudinally as indicated by 4. As shown in the drawings, the sleeve is split into two halves or segments. The splits 4 or discontinuities in the metal sleeve 2 are of very small circumferential dimension so that substantially the entire periphery of the pipe 1 is covered by the sleeve, and the adjacent longitudinal edges of the sleeve at the split are in very close proximity.

The outer end of sleeve 2 adjacent the pipe end is disposed substantially flush with the corresponding end of the pipe 1, and the outer surface of the sleeve is provided with a circumferential groove 3 which is adapted to receive the coupling mechanism.

The inner end portion of the sleeve 2 is tapered, as indicated by 5, to provide the sleeve with a progressively lesser thickness in a direction toward the longitudinal center of the pipe. Sleeve 2 is bonded to pipe 1 by a suitable thermosetting resin which is applied to the inner surface of the sleeve. Alternately, the sleeve 2 can be applied to the outer surface of the pipe 1 while the resin of the pipe is in the uncured state and the resin of the pipe will serve to bond the sleeve to the pipe on curing of the resin. In either case, the resin used to bond the sleeve to the pipe will be squeezed outwardly through the splits 4 and seal the splits against leakage of the fluid being conveyed in the pipe.

The cured resin located in the splits 4 adheres to the metal sleeve to prevent leakage at the interface. Under load conditions the cured thermosetting resin has sufficient elasticity to maintain the bond to the metal sleeve even though the circumferential dimension of the splits is slightly increased due to the radial expansion of the sleeve.

Additional reinforcement is provided for each pipe end by a layer 6 of resin-impregnated, fibrous material which is disposed around the tapered end portion 5 of sleeve 2. The layer 6 may take the form of long strands of glass, mineral, synthetic fibers or the like which are wound circumferentially around the sleeve, or it may take the form of fabric or matting. The layer 6 is spaced from the outer end of the sleeve and extends inwardly toward the longitudinal center of the pipe 1 beyond the inner end of the sleeve to overlay a portion of the pipe. The portion of layer 6 overlaying the pipe 1 has a progressively lesser thickness in a direction toward the longitudinal center of the pipe and is tapered into the pipe. On curing of the thermosetting resin the layer 6 will be bonded to the underlaying portions of the sleeve 2 and pipe 1.

As the layer 6 overlays both the inner end portion 5 of the sleeve 2 and a substantial portion of the pipe 1, any stresses which may occur in the end portion of the pipe will, by virtue of the layer 6, be distributed over a greater length of the pipe and thus the concentration of stresses will be minimized.

To firmly secure the outer end portion of the sleeve 2 to the pipe, the sleeve may be provided with a peripheral recess 7 adjacent the outer end thereof. A plurality of long, resin-impregnated fibers 8, similar to fibers of layer 6, are wound in the recess 7, and on curing of the resin the fibers are bonded to the sleeve and aid in firmly anchoring the sleeve to the pipe. The fibers 8 are wound within recess 7 so as to be substantially flush with the outer surface of the sleeve and thus will not interfere with the attachment of the coupling mechanism.

After preparation of the end portions of the pipe to be joined, two pipe sections can then be secured together by any conventional coupling mechanism. As shown in the drawing, a split coupling 9 is disposed around the exposed portions of the sleeves 2. Coupling 9 is provided with internal ridges 10 which are disposed in the grooves 3 and in the metal sleeves 2. The halves of the coupling 9 are secured together by bolts 11.

To seal the joint between the pipe ends, a rubber sealing ring 12 is disposed within a recess in coupling 9 and bridges the joint.

The coupling 9 and seal 12 are of conventional construction and are not considered to be a part of the invention. Instead of using the coupling 9, the exposed portion of the sleeve 2 could be externally threaded and secured to a similar pipe section through use of a threaded coupling.

While the above description is directed to the use of a metal for the sleeve 2, it is contemplated that any other material having a substantially higher bearing strength, compressive strength and shear strength than the resin pipe 1 can be employed as the sleeve 2.

The present invention provides a built-up pipe end which is of simple construction and inexpensive design. By splitting the metal sleeve longitudinally the sleeve is free to expand with the resin pipe when the pipe is subjected to internal pressure. This feature in combination with the outer layer of fibrous wrapping which overlaps the sleeve and a portion of the pipe section reduces to a minimum the stress concentration at the thickened end of pipe sections joined together to form an extended length of pipe.

This application is a continuation-in-part application of application Serial No. 455,633, filed September 13, 1954, entitled "Coupling for Reinforced Plastic Pipe" of the same inventor.

Various modes of carrying out the invention are contemplated as being within the scope of the following claims particularly pointing out and distinctly claiming the subject matter which is regarded as the invention.

I claim:
1. An article of manufacture comprising a substantially rigid tubular member formed of cured thermosetting resin, a plurality of separate generally arcuate segments circumferentially spaced on the outer surface of the tubular member adjacent an end thereof with the adjacent longitudinal edges of said segments being in close proximity, said segments formed of a material having a substantially higher bearing strength, compressive strength and shear strength than the resin, a nonmetallic bond securing said segments to said member and disposed between said adjacent longitudinal edges, and a layer of fibers impregnated with a cured thermosetting resin disposed around the longitudinally inwardly disposed portion of said segments and spaced longitudinally from the outer end of said segments, said layer extending a substantial distance beyond the inner ends of said segments toward the longitudinal center of the member to overlay a portion of said member, said layer being bonded to the segments and to said portion of the tubular member to provide an integral coupling construction for said member.

2. An article of manufacture comprising a substantially rigid pipe formed of fibrous reinforced cured thermosetting resin, a metal sleeve disposed around an end portion of the pipe, said sleeve being provided with a plurality of longitudinally extending discontinuities extending the length of the sleeve to permit said sleeve to expand generally in conformity with the radial expansion of said pipe when the pipe is subjected to internal pressure, a non-metallic bond securing said sleeve to said pipe and disposed within said discontinuities to seal the same, a layer of substantially continuous fibers circumferentially disposed around the inner end portion of the sleeve and spaced from the outer end of the sleeve to expose the outer end portion of said sleeve, said layer extending a substantial distance beyond the inner end of said sleeve in a direction toward the longitudinal center of the pipe to overlap a portion of the pipe, a resin bond securing said layer to the sleeve and to the pipe to provide an integral structure, and separate coupling means engageable with the exposed end portion of said sleeve for connecting said pipe to the opposed end of a second pipe.

3. An article of manufacture comprising a substantially rigid pipe formed of fibrous reinforced resin, a metal sleeve disposed around an end portion of the pipe with the outer end of the sleeve being in substantial alignment with the end of the pipe, said sleeve being provided with a plurality of circumferentially spaced discontinuities extending the length of the sleeve to permit said sleeve to expand generally in conformity with the radial expansion of said pipe when the pipe is subjected to internal pressure, a non-metallic bond securing said sleeve to said pipe and disposed in said discontinuities to seal the same, a layer of resin-bonded long reinforcing fibers circumferentially disposed around the inner end portion of the sleeve and spaced axially from the outer end of said sleeve, said layer extending a substantial distance beyond the inner end of said sleeve in an axial direction toward the center of the pipe to overlap a portion of the pipe and being bonded to the sleeve and to the pipe to provide an integral structure, and means associated with the outer end portion of the sleeve to receive a coupling mechanism whereby said pipe can be joined to a second pipe of similar structure.

4. An article of manufacture comprising a substantially rigid pipe formed of fibrous reinforced cured thermosetting resin, a metal sleeve disposed around an end portion of the pipe, said sleeve being provided with a plurality of longitudinally extending discontinuities extending the length of the sleeve to permit said sleeve to expand generally in conformity with the radial expansion of said pipe when the pipe is subjected to internal pressure, a nonmetallic bond securing said sleeve to said pipe and disposed within said discontinuities to seal the same, a layer of substantially continuous fibers circumferentially disposed around the sleeve and spaced from the outer end of the sleeve, a cured resin bond securing said layer to the sleeve to provide an integral structure, abutment means disposed on said sleeve and adjacent the outer end portion thereof, and a coupling member having a second abutment means engaging said first abutment means to secure said pipe to the opposed end of a second pipe.

5. A coupling construction for a fiber reinforced resin pipe, comprising a generally cylindrical metallic sleeve disposed around the pipe and having at least one longitudinal discontinuity extending the length of the sleeve to permit the sleeve to expand generally in conformity with the radial expansion of the pipe when the pipe is subjected to internal pressure, a layer of fibers disposed around the inner end portion of said sleeve and spaced axially from the outer end of the sleeve, said layer extending a substantial distance beyond the inner end of the sleeve in an axial direction to overlap a portion of the pipe, and a resin bond disposed between the sleeve and the pipe and disposed within said discontinuity to seal the same and said resin bond being disposed between said layer of fibers and the sleeve to provide an integral structure.

References Cited in the file of this patent

UNITED STATES PATENTS

| | | |
|---|---|---|
| 1,679,709 | Cooper | Aug. 7, 1928 |
| 1,911,570 | Holstein | May 20, 1933 |
| 2,081,021 | Smith et al. | May 18, 1937 |
| 2,219,047 | Maclachlan | Oct. 22, 1940 |
| 2,245,101 | Cole | June 10, 1941 |
| 2,377,510 | Newell | June 5, 1945 |
| 2,506,494 | Feiler | May 2, 1950 |
| 2,525,662 | Freeman | Oct. 22, 1950 |
| 2,567,773 | Krupp | Sept. 11, 1951 |